United States Patent
Martin

(10) Patent No.: US 11,516,725 B1
(45) Date of Patent: Nov. 29, 2022

(54) RAPID TOPOLOGY DISCOVERY THROUGH IDENTIFICATION OF MESH NETWORK EDGES

(71) Applicant: SYNAPSE WIRELESS, INC., Huntsville, AL (US)

(72) Inventor: Jon Martin, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 55 days.

(21) Appl. No.: 16/996,407

(22) Filed: Aug. 18, 2020

(51) Int. Cl.
*H04L 12/28* (2006.01)
*H04W 40/24* (2009.01)
*H05B 47/19* (2020.01)
*H04L 45/02* (2022.01)

(52) U.S. Cl.
CPC ........... *H04W 40/246* (2013.01); *H04L 45/02* (2013.01); *H05B 47/19* (2020.01)

(58) Field of Classification Search
CPC .... H04W 40/246; H04W 84/18; H05B 47/19; H04L 45/02; H04L 41/12; H04L 45/00; H04L 45/04; H04L 45/74; H04L 45/64; H04L 69/22; H04L 45/306; H04L 29/0653; H04L 49/3009; H04L 47/10; H04L 29/06
See application file for complete search history.

(56) References Cited

U.S. PATENT DOCUMENTS

| | | | | |
|---|---|---|---|---|
| 7,107,498 B1 * | 9/2006 | Schmidt | ................... | H04L 1/203 714/704 |
| 7,639,652 B1 * | 12/2009 | Amis | ................... | H04W 40/246 370/335 |
| 7,916,723 B2 * | 3/2011 | Fan | ................... | H04L 29/12943 370/389 |
| 9,226,220 B2 * | 12/2015 | Banks | ................... | H04W 40/246 |
| 10,506,436 B1 * | 12/2019 | Newman | ............... | H04L 9/3268 |
| 10,680,899 B1 * | 6/2020 | Ibarra | ................... | H04L 49/201 |
| 11,146,479 B2 * | 10/2021 | Plate | ................... | H04L 12/6418 |
| 2006/0176834 A1 * | 8/2006 | Dickerson | .............. | H04N 7/185 370/352 |
| 2006/0268908 A1 * | 11/2006 | Wang | .................... | H04L 47/829 370/401 |
| 2007/0104215 A1 * | 5/2007 | Wang | .................... | H04L 47/762 370/458 |

(Continued)

FOREIGN PATENT DOCUMENTS

| | | | | | |
|---|---|---|---|---|---|
| CN | | 107316268 A | * | 11/2017 | ............. H04L 41/12 |
| WO | WO-2013033457 A1 | | * | 3/2013 | ............. H04L 41/12 |

*Primary Examiner* — Phuongchau Ba Nguyen
(74) *Attorney, Agent, or Firm* — Maynard Cooper & Gale, P. C.; Jon E. Holland

(57) ABSTRACT

To speed up a firmware update process, a gateway performs an expedited topological discovery of networked nodes. The gateway maintains a list of unlinked network nodes that are not known to share good edges with other nodes. The gateway transmits a topology query to a selected unlinked node, which the node retransmits to its neighboring nodes. Each neighboring node responds to the gateway with a link status of the edge between the queried node and the neighbor. The queried node and each neighboring node with an edge of sufficient link quality are removed from the list of unlinked nodes. The process is repeated until no networked nodes remain in the list of unlinked nodes. The gateway then sends a firmware update to nodes that will in turn retransmit the update over identified good edges.

20 Claims, 5 Drawing Sheets

(56) References Cited

U.S. PATENT DOCUMENTS

| | | | |
|---|---|---|---|
| 2007/0133469 A1* | 6/2007 | Shin | H04W 40/34 370/331 |
| 2007/0183344 A1* | 8/2007 | Joshi | H04W 8/02 370/254 |
| 2010/0226342 A1* | 9/2010 | Colling | H04W 56/002 370/336 |
| 2011/0164527 A1* | 7/2011 | Mishra | H04L 45/123 370/252 |
| 2012/0039177 A1* | 2/2012 | Kubisch | H04W 8/005 370/241 |
| 2012/0155463 A1* | 6/2012 | Vasseur | H04L 67/145 370/390 |
| 2013/0121337 A1* | 5/2013 | Nguyen | H04L 45/70 370/410 |
| 2013/0329601 A1* | 12/2013 | Yin | H04L 41/0895 370/254 |
| 2017/0111206 A1* | 4/2017 | Rajapakse | H04W 56/0015 |
| 2018/0367973 A1* | 12/2018 | Bloechl | H04W 48/20 |
| 2019/0075469 A1* | 3/2019 | Mahoney | H04W 16/12 |
| 2019/0310949 A1* | 10/2019 | Lev | G06F 16/1774 |
| 2020/0059771 A1* | 2/2020 | Zhang | H04L 67/1042 |

\* cited by examiner

N2 Link Status Table

| Transmitting Node | Receiving Node | Link Quality (RSSI) |
|---|---|---|
| N3 | N2 | -40 dBm |
| N1 | N2 | -50 dBm |

RAPID TOPOLOGY DISCOVERY THROUGH IDENTIFICATION OF MESH NETWORK EDGES

BACKGROUND

Internet-of-things (IoT) devices, such as sensors or lighting systems, may be configured to function as nodes of a wireless mesh network, capable of receiving data from and transmitting data to other network devices. Modern IoT systems may require complex installations of many nodes. To communicate messages across a network, a network management device may rely on multicast transmission, where each node is capable of receiving, transmitting, and relaying traffic to one or multiple neighboring nodes, creating a topology in which there is generally more than one route between any two nodes.

In a common implementation, a network management device can communicate with other devices on a mesh network by sending out a multicast message with the network's unique network identifier and allowing the message to propagate through the network, being processed only by nodes configured to recognize and process messages with that network identifier. In a common implementation, a network management device can conduct topological discovery on the network by sending out a multicast topological discovery message and listening for a reply by every responsive node. However, as multiple paths may exist to reach any node, the same multicast message may unnecessarily be sent to the same node multiple times. This may lead to an increase in network traffic, particularly as networks increase in complexity and size. What is more, depending on radio frequency (RF) channel availability, there are a limited number of packets that can be simultaneously transmitted wirelessly. If two nodes attempting simultaneous transmission are within range of each of other, and attempt to transmit at the same frequency, the transmissions may interfere, or "collide," with each other. Where there is a great deal of traffic on a wireless network, the probability of data collision increases. In a network configuration with a higher probability of data collision, a transmission of data may take longer to reach its intended target (higher end-to-end latency) or data may be lost. As a result, messages may need to be resent, adding to the overall network traffic. This reduces network efficiency and may increase needed network resources. Further still, extended transmission time between networked nodes can lead to partial or total network outages.

Further techniques to perform topological discovery and facilitate communication through a network quickly and with reduced traffic are therefore generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

Figure 1A:
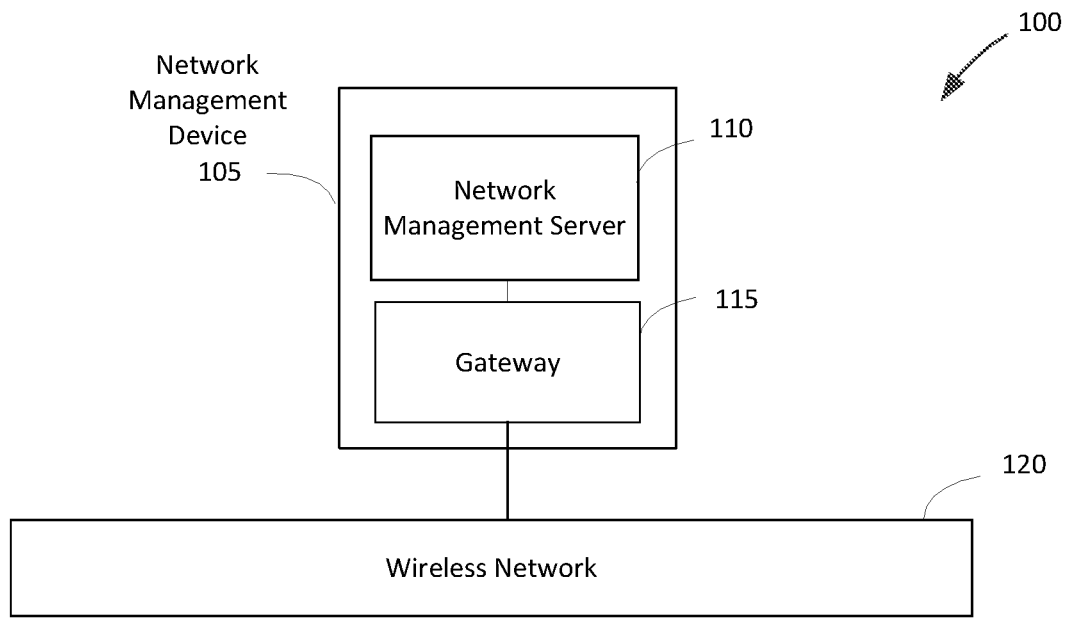
FIG. 1A is a block diagram of an exemplary embodiment of a wireless network in accordance with the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure generally pertains to control systems and methods for wireless network management, specifically efficient distribution of messages through wireless mesh networks. For example, the disclosure is directed to an improved implementation where a gateway device performs a topological search to quickly discover just enough paths to reliably reach every node in a wireless mesh network, and distributes a firmware update to reach every node along those paths. For ease of reference herein, the term "edge" may be used to describe a communication relationship (or a link) forming a path between two neighboring nodes (nodes that are one hop apart). In some embodiments, an edge is defined by the node identifiers of the two nodes (e.g., their unique network identifiers), such as a pair or tuple. A "good" edge may be used herein to describe a link between nodes that can reliably transmit and receive messages with each other, given the limitations of RF transmission, environmental conditions, node statuses, and the like. Conversely, a "bad" edge may be used herein to describe a link between nodes that cannot reliably communicate, for example where the link quality is insufficient to ensure that a message transmitted from one node to the other will be successfully received.

In one embodiment, a network management device is aware of all of the nodes in the network, having earlier performed a comprehensive topological discovery. The network management device maintains, in a memory, a list of "unlinked" nodes that have no known good edges, a list of "queried" nodes that have been sent requests for information about their neighboring nodes, a list of bad edges, and a list of good edges. In an initial state, all nodes on the network are included in the list of unlinked nodes and no nodes are included in any of the lists of queried nodes, good edges, or bad edges. The network management device transmits a topological discovery message via multicast transmission over a wireless mesh network to one or more selected nodes to query from the list of unlinked nodes, and adds those selected nodes to its list of queried nodes.

In one embodiment, a selected node (also referred to herein as a query node) has a receiver that receives the multicast message. Based on information in the header of the multicast message, the query node broadcasts out a one-hop multicast message (e.g., a multicast message having a TTL value equal to 1) instructing any receiving nodes to respond to the network management device with their own node identifier and information regarding the link between the query node and the receiving node. In an exemplary embodiment, the information regarding the link is a link quality measurement between the nodes, such as a received signal strength indicator (RSSI) value.

In some embodiments, the network management device waits a predetermined amount of time (a waiting period) for responses to its query. This predetermined amount of time may be set by one or more rules stored at the network management device. In some embodiments, the network management device may determine the waiting period dynamically based on the number of nodes in the network and/or one or more environmental conditions. After the waiting period has expired, the network management device concludes that a response has been received from all nodes within one communication hop of the query node (the neighboring nodes). The network management device then analyzes the information regarding the link between the query node and each respective responding node to determine if a good edge exists between the two. In some embodiments, this determination is made by comparing the link quality to a threshold value and, in others, the existence of a response is sufficient to determine that a good edge exists between the nodes. In some embodiments, the threshold link quality value is preset in a memory of the network management device. The threshold value may be determined (whether in advance or dynamically) by a site administrator, or if automated, based on one or more factors including, e.g., environmental conditions, node or network availability, day/time data, or other factors that may indicate a divergence from an expected link quality value. In an alternate embodiment, the analysis of the link quality may be performed by the queried node or the neighboring node, and then transmitted to the network management device.

In one embodiment, in a case where the link quality between two nodes meets the threshold value, the edge is considered a good edge and is stored in the appropriate list in the memory. The query node and the neighboring node that form the good edge are removed from the list of unlinked nodes, if stored therein, and the edge is added to the list of good edges, if not already there. In one embodiment, in a case where the link quality does not meet the threshold value, the edge is added to the list of bad edges, the query node is removed from the list of unlinked nodes (if still there), but the neighboring node is retained in the list of unlinked nodes (if still there). This process is repeated for each node in the list of "unlinked" nodes that are not yet "queried" nodes until no nodes remain in the unlinked list, that is, at least one good edge has been found for each node. Because the network management device has identified, for every networked node, at least one edge via which the node may receive a firmware update, the discovery process can end. That is, there is no need to continue to query nodes once a fully-connected graph of good edges to all nodes has been discovered, regardless of whether additional good edges may exist. However, it is possible for more nodes to be queried, if desired.

In some embodiments, one or more nodes are not connected to any other nodes through a good edge (unlinked), resulting in a graph or mapping indicating paths to only some of the nodes and not others, viz., a partially-connected graph. Alternatively, an embodiment may exist where a node is connected to at least one other node but paths do not exist between the node and every one of the other networked nodes, also resulting in a partially-connected graph. In either of these scenarios, the network management device considers "clusters" or sets of nodes connected to each other by good edges. The network management device contains logic sufficient to select the smallest cluster from the graph, and from that cluster, to select a node with the fewest good edges that is not in the queried node list. The network management device then repeats the process described above using the selected node as the query node, by sending the selected node a topographical query (prompting the transmission of neighboring node information) via directed multicast. The process continues until no unlinked nodes remain.

In the exemplary embodiment, the processes described above result in a graph or mapping indicating at least one path to each networked node, viz., a fully-connected graph. The network management device contains logic sufficient to apply any known graph algorithm to find a path to each node (e.g., shortest path to each node) and generates a set of nodes from which messages will be retransmitted to all of the networked nodes, based on the graph information.

In conventional solutions, a network management device conducts a census by transmitting a topological request to each networked node. A node receiving the topological request obtains information about its neighbors by sending a one-hop multicast message and then transmits, to the gateway, a response containing the node's identifier, a list of the node's neighbors, and a measurement of link quality between the node and its neighbors. The network management device may then send a topological request to each of the node's neighbors, repeating the process until no additional neighbors exist. Each node on the network must respond in order for the network management device to obtain a full network topology containing all possible edges. The network management device may then push out an update by multicast transmission, where each node retransmits the entirety of the update to each of its neighbors. However, in an implementation where a network has a dense configuration of many nodes (such that any node has several neighbors) or the network is otherwise very large, this method does not scale efficiently. The topological discovery process is slow, may require a large number of messages to be sent and may increase network traffic, data collisions and delays in packet transmission. In cases where a firmware update is sent, transmission delays may lead to increased network downtime or maintenance time, wasting human and computing resources.

In contrast, by virtue of the systems and methods described herein, topological discovery can be ended after the system finds a minimal amount of "good" edges that meet a certain threshold for reliable communication, without the need to obtain a comprehensive topological map of every possible link. That is, the overall process of network upgrade, which process usually includes extended topology discovery, can be greatly shortened. By these means, the systems and methods described herein reduce the number of messages (and therefore overall network congestion) that might otherwise be required for software or firmware update, improve network uptime, and reduce computing resources used in the update process.

FIG. 1A depicts an exemplary embodiment of a network control system 100 comprising a network management server 110 coupled to a gateway 115. In an exemplary embodiment, network management server 110 and gateway 115 are different logical components in network management device 105, however, in alternate embodiments, network management server 110 and gateway 115 may be discrete network devices connected via a wireless or wired connection. In yet another alternate embodiment, the functionalities of network management server 110 and gateway 115 are all performed by a single logical component of the network management device 105. In exemplary embodiments, the functionalities of the systems and methods described herein with reference to FIGS. 1B-6 are performed at and by the gateway 115. To that end, solely for ease of discussion regarding the described embodiments, the term gateway 115 may be used herein.

However, in other embodiments, all or a subset of the functionality and/or components described herein as being performed by or belonging to gateway 115 may be implemented in another component of network management device 105, whether local to or remote from gateway 115.

In some embodiments, if the network management server 110 is at a remote location, the gateway 115 may receive messages from the wireless network 120 and encapsulate such messages in accordance with TCP/IP or other protocol for transmission of the messages to the network management server 110 through a WAN, LAN, or other type of network. Messages from the wireless network 120 to be transmitted to other destinations may be similarly encapsulated or otherwise converted into a different protocol as may be desired. In the opposite direction, the gateway 115 may de-encapsulate messages received from a WAN or other type of network to remove overhead for routing messages through the wireless network 120. In addition to, or as an alternative to, wireless communication, any or all of the components of the system 100 may be coupled to another component through a physical medium. In the present disclosure, for ease of discussion, the term "gateway" is disclosed as managing a "network", however it is understood that the gateway may instead manage topology for only a portion of a network, or a subnetwork containing only a subset of devices of the entire wireless network. Additionally, while the term "gateway" is used, it will be understood that such term can refer to any device that joins two networks (or subnetworks) so as to allow communication therebetween, even if the device performs other additional functions. The gateway is understood to refer to either hardware or software or any combination thereof.

For illustrative purposes, it can be assumed that any of the components of system 100 are capable of wireless communication with any device or component connected to it (either directly or indirectly) by the depicted lines. However, it will be noted that in addition to, or as an alternative to, wireless communication, any or all of the components of the system 100 may be coupled to another component through a physical medium.

Figure 1B:
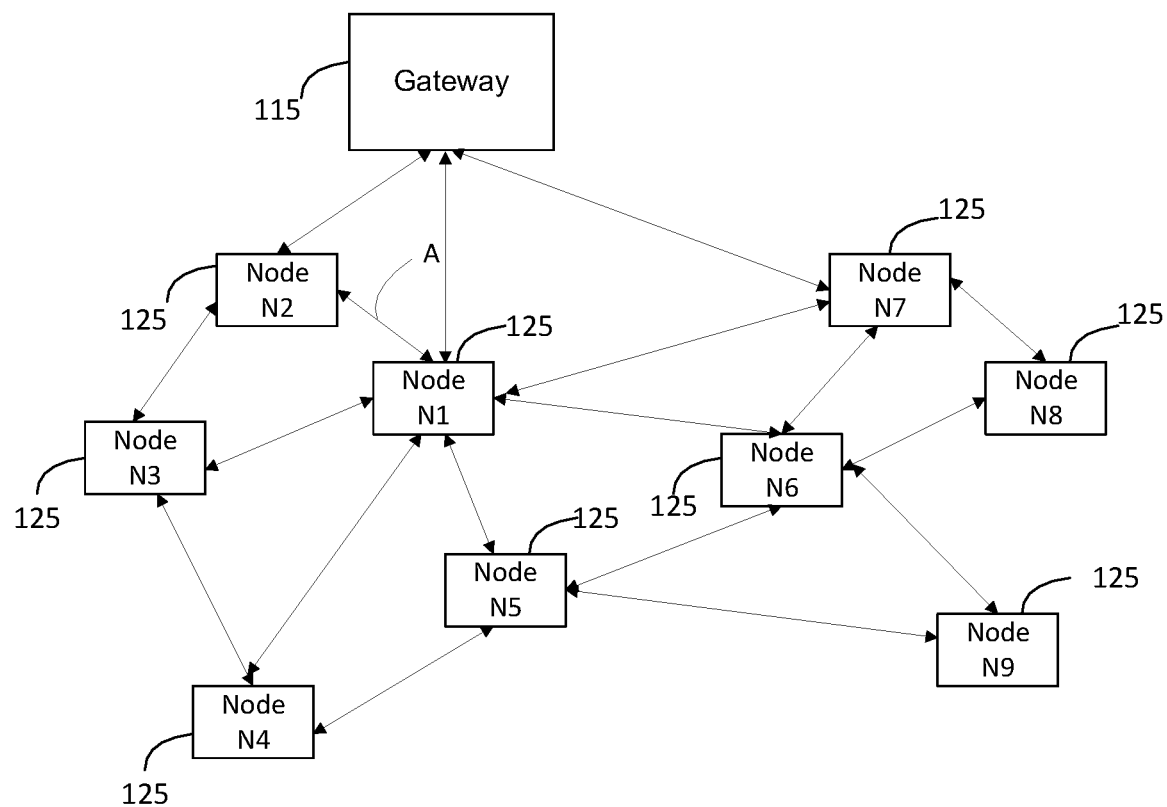
FIG. 1B is a block diagram of an exemplary embodiment of a wireless mesh network in accordance with the present disclosure.

In the embodiment of FIG. 1B, the wireless network 120 may be a network of devices, each represented as a node 125. Nodes 125 function to implement an ad hoc mesh network. Each respective node 125 can be stationary (fixed in place) or can be mobile, such that it can be moved to a different physical location. In some embodiments, this network may be topologically variable, as mobile nodes may move to a different location, additional nodes may be added, or nodes may be removed or become inaccessible. Different types of wireless or, alternatively, wired networks (or combinations thereof) are possible in other embodiments. In one exemplary embodiment, the nodes 125 communicate among one another wirelessly, but it is possible for any of the nodes 125 to communicate with any of the other nodes 125 over a conductive or optical medium. In other embodiments (not specifically shown), use of a gateway may be unnecessary and network management device 105 may instead have a communication device, such as an RF radio, that permits the network management server 110 to communicate directly with the wireless network 120 in accordance with the protocol used by the wireless network 120.

Figure 2:
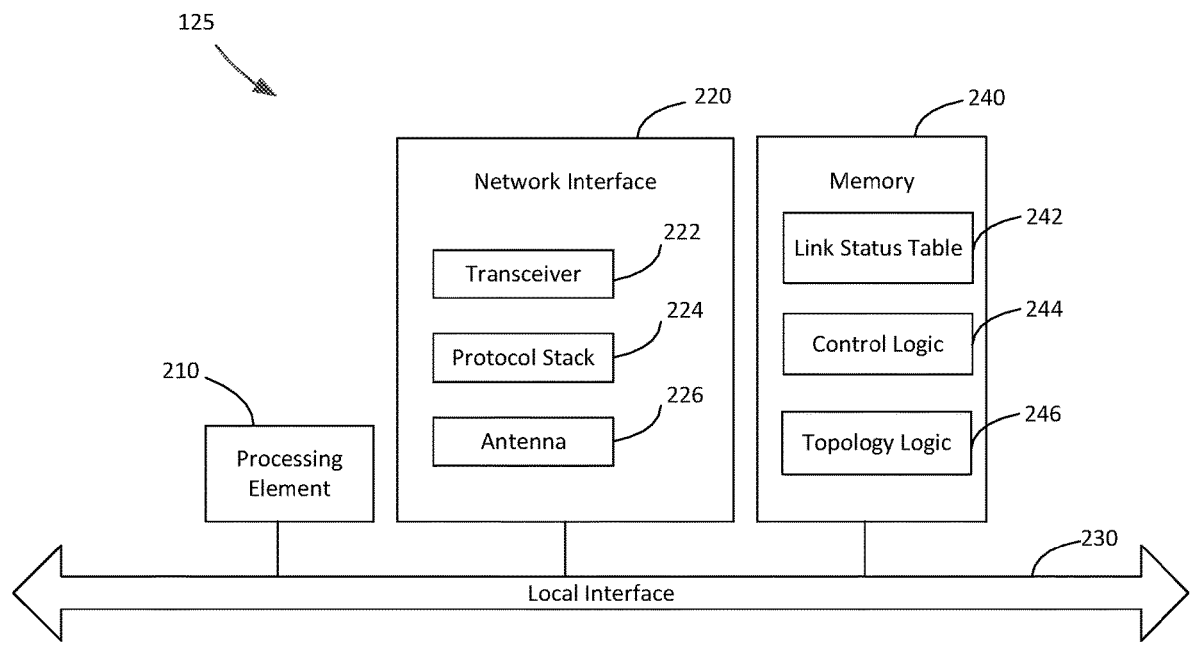
FIG. 2 is a block diagram of an exemplary embodiment of a network node, such as is depicted by FIG. 1.

FIG. 2 depicts a node 125 in accordance with an exemplary embodiment of the present disclosure. The exemplary node 125 comprises at least one processing element 210, such as a central processing unit (CPU), digital signal processor, other specialized processor or combination of processors, or other circuitry that communicates to and drives the other elements within node 125 via a local interface 230 (for example, a bus). The node 125 has control logic 244 for generally controlling the operation of the node 125 and topology logic 246 for reading and writing data from/to the link status table 242. In some embodiments, topology logic 246 may also perform some degree of processing of messages sent by the gateway 115 and/or other networked devices. The control logic 244 and/or topology logic 246 can be implemented in software, hardware, firmware, or any combination thereof. In the embodiment illustrated in FIG. 2, the control logic 244 and/or topology logic 246 are implemented in software and are stored in a memory 240. Control logic 244 and/or topology logic 246, when implemented in software, can also be stored on any computer-readable medium, for example electronic, magnetic, or optical mediums, among others, or another system, apparatus, or device. The control logic 244 and/or topology logic 246 are implemented by processing element 210, which comprises processing hardware (e.g., one or more processors) for executing instructions stored in the memory 240, or any other circuitry capable of executing the instructions of the control logic 244 and/or topology logic 246.

Figures 3, 4:
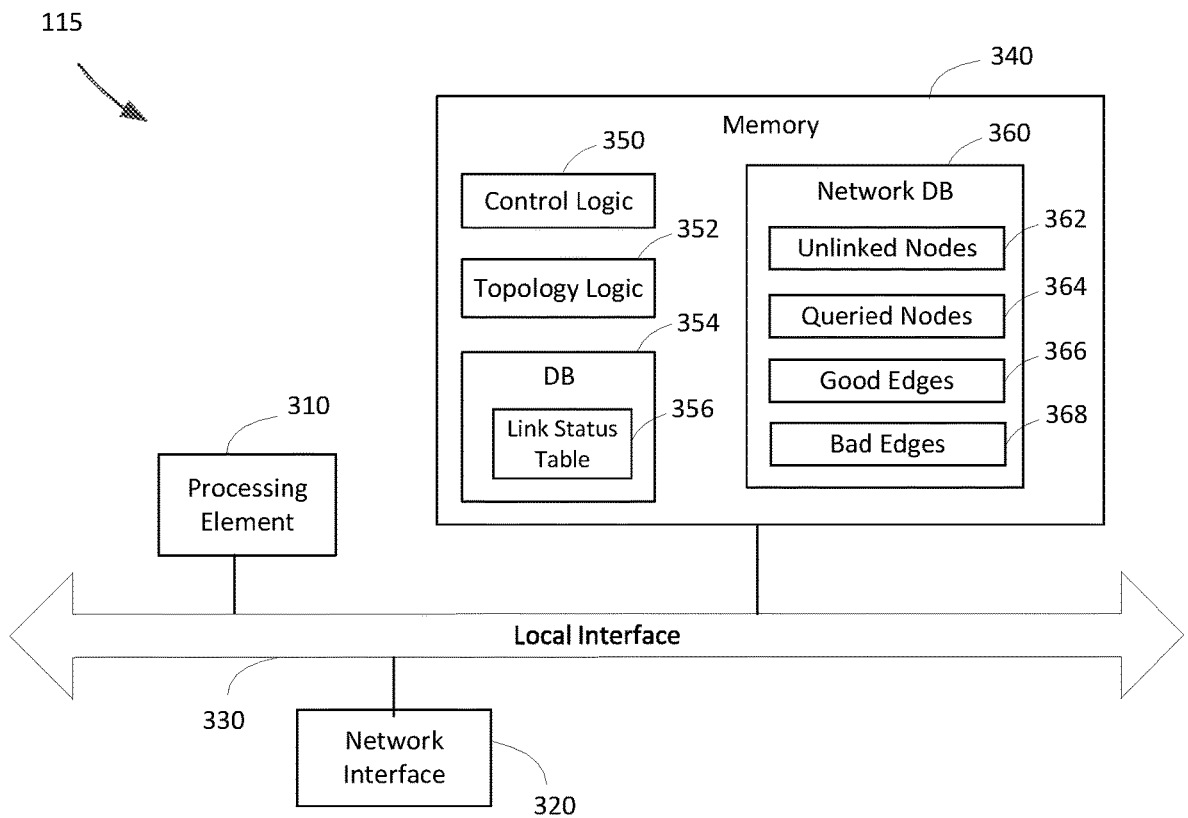
FIG. 3 is a block diagram of an exemplary embodiment of a network gateway device in accordance with the present disclosure.
FIG. 4 is a diagram of an exemplary table maintained in the memory of a network node depicted in FIG. 2.

As used herein, memory 240 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Control logic 244 and/or topology logic 246 may be implemented in software, hardware, firmware, or any combination thereof. Various other data and code can also be written to or read from memory 240. When implemented in software, control logic 244 and/or topology logic 246 can also be stored on any computer-readable medium, for example electronic, magnetic, or optical mediums, among others, or another system, apparatus, or device. In the embodiment of FIG. 3, logics 244 and 246 are implemented by the processor 210 or may in other embodiments be implemented by any other circuitry capable of executing the instructions thereof.

The node 125 also has a network interface 220 for enabling communication with other nodes over the network 120 and with the gateway 115. In an exemplary embodiment, the interface 220 is configured to communicate wirelessly over one or more geographic areas, but the interface 220 may alternately or additionally exchange data via a physical medium. As shown in FIG. 2, the network interface 220 has one or more of each of an antenna 226, a transceiver 222, and a protocol stack 224. The stack 224 controls the communication of data between the network interface 220 and the other networked nodes. In the exemplary node 125, the stack 224 is implemented in software, however, it may also be implemented in hardware, software, firmware, or any combination thereof. When implemented in software, the stack 224 may be stored in the node's memory 240 or other computer-readable medium. In one exemplary embodiment, each component shown by FIG. 2 (or a subset thereof) resides on and is integrated with a printed circuit board (PCB) (not shown). However, in other embodiments, other arrangements of the node 125 are possible.

Figure 6:
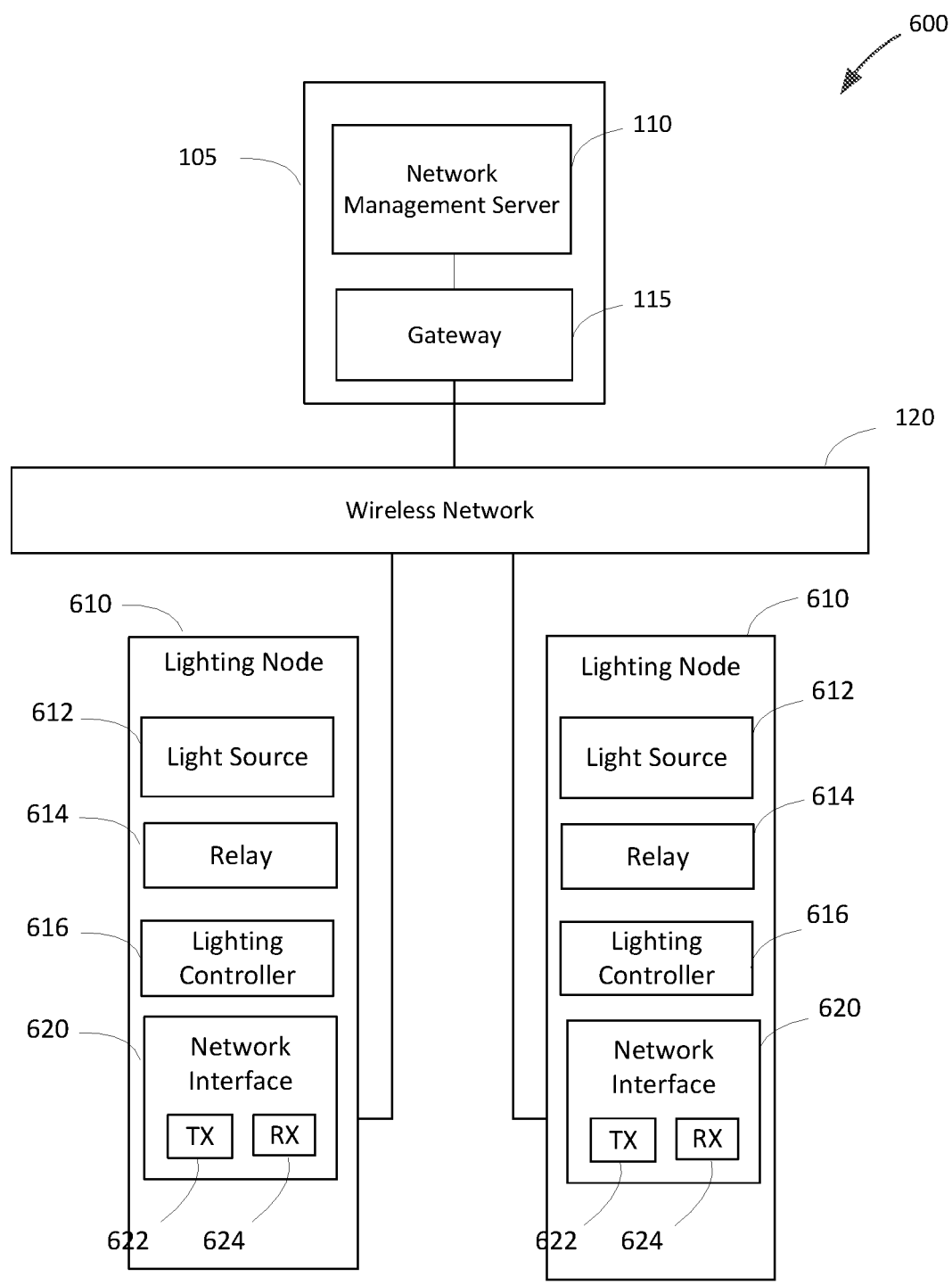
FIG. 6 is a block diagram of an exemplary embodiment of a lighting system in accordance with the present disclosure.

FIG. 6 illustrates an embodiment where the network control system is a lighting system 600, and gateway 115 connects the network management server 110 to one or more lighting nodes 610 via wireless network 120 (a mesh network). In one exemplary embodiment, light sources (such as light-emitting diodes, commonly referred to as LEDs) are installed in an indoor facility so as to belong to a network of devices, the devices acting as nodes 125. The light sources function as RF receivers/transmitters that can be controlled by a set of lighting controllers, and that the gateway 115 communicates with the light sources and their controllers through a wireless network. While FIG. 6 illustrates two lighting nodes 610, it will be generally understood that the number and layout of the lighting nodes in the lighting system 610 depends on the particular needs of the facility in which they are installed, and that, in different embodiments, any appropriate number of lighting nodes may be used.

Each lighting node 610 comprises a light source 612 such as a light emitting diode (LED) (or if appropriate, a laser diode, a fluorescent lamp, an incandescent light, or other light source) mounted in a lighting fixture. Each lighting node 610 may further include a lighting controller 616 for controlling the light source 612, a relay 614 configured to regulate the supply of electrical current to the light source 612 based on control signals from the lighting controller 616, and a network interface 620 for communicating via wireless (e.g., RF) signals. Network interface 620 may comprise a transmitter (TX) 622 for transmitting a wireless signal and a receiver (RX) 624 for receiving a wireless signal. In some embodiments, network interface 620 may use wireless (e.g., RF) communication to transmit/receive data to/from other lighting nodes, other devices (e.g., assets or tags) on the network, and/or the gateway 115. In other embodiments, they could alternately communicate via infrared or ultrasound technology or any other appropriate type of wireless communication. Further, each lighting node 610 may include one or more processing elements and or more one more memories (not specifically shown) configured to store and execute logic along the lines of control logic 244 and/or topology logic 246. The processing element(s) may be a CPU or any circuitry that communicates to and drives the other elements within the lighting node 610. In FIG. 6, only one light source 612 and one lighting controller 616 are shown in each lighting node 610 for illustrative purposes, but in other embodiments, any number of light sources 612 and any number of lighting controllers 616 may be utilized in each lighting node 610, and/or multiple light sources may be controlled by a single lighting controller 616. Lighting controller 616 can exercise various controls over lighting node, including, for example, turning the light source 612 on and off, dimming the brightness of the light source 612, or, in a preferred embodiment, instructing the light source when to collect and/or transmit topological information or other messages via network interface 620. In an exemplary embodiment, each lighting node 610 is stationary (fixed in place) after installation, however, alternate embodiments may exist such that a light source may be moveable within a given area (e.g., to oscillate or illuminate different areas) or may be moveable to a different physical location.

FIG. 3 depicts a gateway 115 in accordance with an exemplary embodiment of the present disclosure. The exemplary gateway 115 comprises at least one processing element 310, such as a central processing unit (CPU), digital signal processor, other specialized processor or combination of processors, or other circuitry that communicates to and drives the other elements within gateway 115 via a local interface 330 (for example, a bus). The gateway 115 has a network interface 320 for enabling communication (directly or indirectly) with other devices in system 100, including the nodes 125 and other objects capable of RF communication (or other wireless communication) such as RF-capable tags, and in some embodiments, devices outside of network control system 100. In an exemplary embodiment, network interface 320 enables the gateway 115 to communicate with network management server 110, such communication typically being performed over a wide area network (WAN), such as, for example, the internet, or other type of network. In an exemplary embodiment, the network interface 320 is configured to communicate wirelessly over one or more geographic areas, but the interface 320 may additionally or alternately facilitate the exchange of data via a physical medium.

The gateway 115 has a memory 340 that stores a control logic 350 for generally controlling the operation of the gateway. The control logic 350 may also be configured to, via the network interface 320, communicate with the nodes 125 by transmitting messages to their network interfaces 220 in order to control their configuration and operation, for example, to push software or firmware updates to nodes, commission or reconfigure the nodes, check the status of the nodes or obtain information therefrom, push instructions, or the like. For example, where a node 125 is a lighting system 610, the control logic 350 may communicate with the lighting system to manage an on/off state of a light source 612, to send a firmware update to ensure compliance with network standards, or to send lighting instructions or maps/patterns. The control logic 350 can be implemented in software, hardware, firmware, or any combination thereof.

Memory 340 may also store a topology logic 352 for performing topological discovery of one or more nodes 125 on the network 120 based on information sent to the gateway from the nodes. In some embodiments, the functions of topology logic 352 (or a portion thereof) may be performed by the control logic 350. Memory 340 may also store a database 354 including a link status table 356. Link status table 356 includes one or more tables with link status information regarding nodes 125 based on information received from the nodes. Database 354 may also store other data necessary to the management of network 120. In some embodiments, database 354 may store an overall topological map of the network 120 (or a subnetwork thereof). While database 354 is depicted in FIG. 3 as a single component including link status table 356, some embodiments may instead use one or more databases containing data relating to both, or may use a database shared by other components separate from the system 100. Some embodiments may store link status table 356 in a data structure separate to database 354.

Memory 340 may also store a network database 360 containing one or more sets of data for use by topology logic 352 and/or control logic 350 in pushing software or firmware updates to nodes 125 on network 120. In particular, network database 360 may store data related to unlinked nodes 362, where "unlinked" nodes are nodes 125 for which gateway 115 has not yet found a path on mesh network 120 through which to push an update. Network database 360 may further include data related to queried nodes 364, where "queried" nodes are nodes 125 to which gateway 115 has sent a topology query for transmission to their respective neighboring nodes. In addition, data relating to "good" edges 366 and "bad" edges 368 may be stored in network database 125, each containing data regarding the ability of particular pairs of nodes to communicate with each other. An "edge" may be understood as a communication link between two nodes; for example with reference to FIG. 1B, edge A represents the communicative connection or link between nodes N1 and N2. The data relating to unlinked nodes 362, queried nodes 364, good edges 366, and bad edges 368 may be used by control logic 350 and/or topology logic 352 as described in greater detail herein.

As used herein, memory 340 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Further, where this disclosure may refer to one or more "maps", "tables", or "databases," it will be understood that these components are limited in number, nor is any particular form or configuration of data storage mandated, and the described "databases" and other components may alternatively be indexed tables, keyed mappings, or any other appropriate data structure(s). Various other data and code can also be written to or read from memory 340. Control logic 350 and/or topology logic 352 may be implemented in software (as in FIG. 3), hardware, firmware, or any combination thereof. Various other data and code can also be written to or read from memory 340. Control logic 350 and/or topology logic 352, when implemented in software, can also be stored on any computer-readable medium, for example electronic, magnetic, or optical mediums, among others, or another system, apparatus, or device. In the embodiment of FIG. 3, logics 350 and 352 are implemented by the processor 310 or may in other embodiments be implemented by any other circuitry capable of executing the instructions thereof.

With reference to FIGS. 1A and 1B, each node 125 is a distinct node of the wireless network 120 and is independently manageable through use of an identifier that uniquely identifies the node so as to distinguish it from other nodes of the wireless network 120. After installation of the network 120 (for example, installation of the devices acting as nodes 125 in a facility), a node 125 may be known to the network management server 110 by its MAC address or other type of address or ID. The gateway 115 conducts a process of identifying the node 125 to be part of the network and associating the node at the server with its unique identifier, such process being referred to herein as an automated topological discovery process (or simply as "discovery" for ease of reference). Generally, the discovery process is performed after installation of the nodes and before configuration of those nodes or regular operation of those nodes on the network. Topological discovery may also be performed at other times, e.g., upon request of a network management device or administrator, after network maintenance is conducted, when devices are added, removed, or change location, or otherwise periodically or as scheduled. The topological discovery process is intended to identify all or a subset of the nodes on the network (or subnetwork) specified by the parameters included in the discovery request.

In general, the gateway 115 uses multicast or directed multicast messaging to communicate with nodes across the network 120, such that messages may be sent to multiple nodes from a first transmitting node. In other embodiments, unicast messages, broadcast messages, and/or other types of communication may be used. A multicast message does not follow a single path defined by routing tables to a destination node, but is instead gradually retransmitted (also referred to as "rebroadcasting" or "forwarding") by nodes that receive the message regardless of the message's destination or destinations. A multicast message is typically retransmitted by each node that receives it, and a node that receives a multicast message usually does not return an acknowledgment to the sender. A multicast message includes a header and a payload portion that includes the intended content data, if any. Nodes 125 process, retransmit, and/or broadcast the message through the network 120 based on the information in the message header, such as the message type. The header of the multicast message typically contains network identifying information, such as network parameters (e.g., network ID) and/or a group identifier. Upon processing a multicast message after receipt, a receiving node will be able to determine whether it is an intended recipient of the message based on those network parameters, and in some embodiments, group identifier(s). More specifically, the node may compare one or more network parameters specified in the message to its own network parameters, such comparison being managed at the network layer of the node. In this disclosure, a multicast message specifying a particular group identifier or control identifier, so as to target an intended set of one or more recipient nodes, may also be referred to as a "directed multicast" message.

The header of a multicast message may include a finite transmission period or a time-to-live (TTL) value, which is decremented every time the message is transmitted/retransmitted (a "hop"). At the point that the TTL value reaches zero or some other set threshold, the message is no longer retransmitted. Using this practice, propagation of the multicast message eventually stops so that a message is not retransmitted in perpetuity. Alternatively, another manner of setting a finite time limit on the transmission period can be implemented.

Referring to FIG. 1B, each of nodes N1-N9 may both send and receive messages and/or topological pings to or from its respective neighboring nodes. Because of this, each of the nodes N1-N9 may alternately act as a "transmitting node" that transmits to a neighbor at the request of the gateway, and also as a "receiving node" that receives a message and processes it and/or collects information about link status at the request of a neighboring transmitting node. This information about link status may include, e.g., information identifying the transmitting node and information about the link quality between such transmitting node and the receiving node. For example, a receiving node could determine the network identifier of the transmitting node from the source address of the message (or any other piece of information that would uniquely identify the transmitting node, such as, for example, a MAC address) and an indicator of link quality such as a received signal strength indicator (RSSI) for the message, a measurement of signal power in the received signal, or received channel power indicator (RCPI). While an exemplary embodiment uses a measurement of RSSI, any other measurable indicator of link quality may be used in the alternative, or in combination with RSSI. It will be understood that RSSI is dependent on and reflective of the environmental conditions of the indoor or outdoor space in which the nodes are located. The receiving node N1-N9 then stores these pieces of information (for example, the network identifier of the transmitting node and the RSSI) in association with each other in the receiving node's memory in link status table 242.

FIG. 4 depicts an exemplary embodiment of a link status table 242 stored in the memory of an exemplary node N2, after node N2 has gathered information about link status in response to messages received from its neighboring nodes. As depicted in FIG. 1B, Node N2 neighbors nodes N1 and N3, therefore, one or both of nodes N1 and N3 may have sent a message to node N2. Node 2 therefore determines and stores, for each of the messages sent, a separate table entry including a network identifier 410 of the transmitting node, a network identifier 420 of the receiving node (here, node N2), and a measurement of link quality 430. In some embodiment, it is unnecessary for the table to include the network identifier of the receiving node. In this regard, the receiving node is aware of its own network identifier and may provide it to the gateway when providing the link status information without storing it in the table 242. Alternatively, the receiving node may not provide its identifier 420 to the gateway at all, and the gateway may determine the identifier 420 of the receiving node based on the source address of the receiving node's transmission to the gateway. As a receiving node receives additional or subsequent messages from neighboring nodes, the receiving node will add additional line entries to the link status table 242 corresponding to those transmitting nodes. It will be understood, of course, that while FIG. 4 depicts a table, any data structure may be used to store this type of information, so long as an association between the network identifier of the transmitting node and the RSSI (or comparable information) is maintained.

Once a receiving node has processed messages from its neighbors, and has compiled the relevant information in a link status table 242, this information is sent by the receiving node to the gateway 115 for consolidation and analysis. Accordingly, in an exemplary embodiment, each node will independently send information from the link status table 242 to gateway 115. The message containing the link status information is, in the exemplary embodiment, a directed multicast message to the gateway, where the data within the message is not processed by any intermediate node, though other embodiments may differ. The link status information is aggregated, with the other received link status information, by the gateway 115 itself, and stored in the link status table 356 at the gateway 115. It will be understood that, based on the amount of data contained in a link status table 242, nodes N1-N9 may need to send multiple multicast messages to convey all relevant information to gateway 115.

Figure 5:
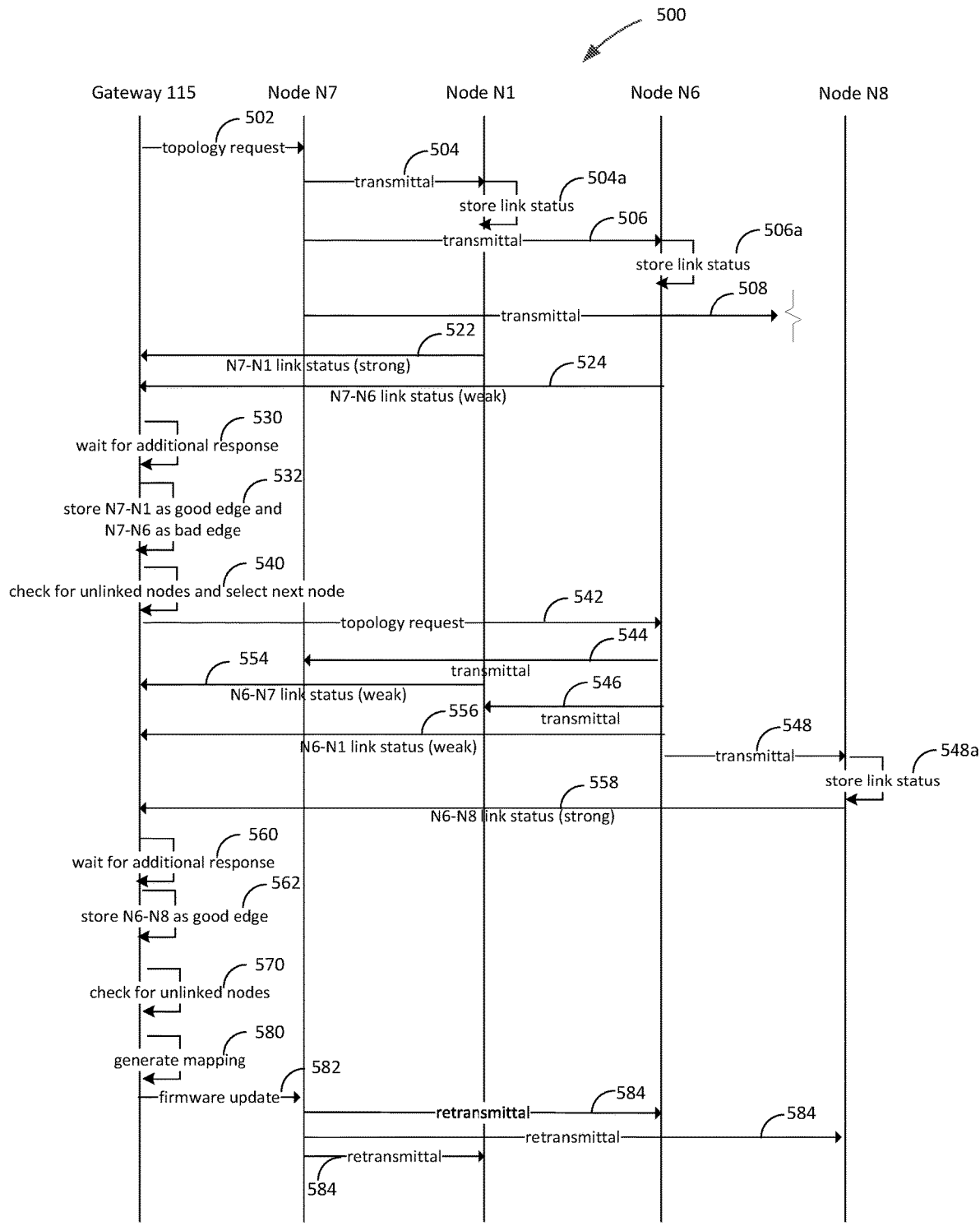
FIG. 5 is a diagram of an exemplary transmission of data between network devices in accordance with the present disclosure.

FIG. 5 depicts an exemplary process 500 of identifying nodes to which the gateway should transmit a firmware (or software) update based on a limited topology discovery process. In the exemplary embodiment, the firmware update is intended to ultimately be pushed to all nodes 125 on the network, however in other embodiments, the gateway 115 may instead identify a subset of nodes that will be recipient to the upgrade.

In the embodiment of FIG. 5, it can be assumed that the gateway 115 has already performed a comprehensive initial topological discovery process, such that the gateway 115 is aware of the presence and/or identity of all nodes 125 (or all active nodes) on the network 120. This initial topological discovery is performed in advance of process 500, however no specific advance timeframe is required, such that nodes may be identified and/or provisioned hours, days, months, or any amount of time prior to process 500. Other embodiments may exist in which an initial (or updated) topology auto-discovery must be performed, or in which all nodes on network 120 are requested to report to the gateway 115, prior to the beginning of process 500. Gateway 115 maintains, in network database 360, unlinked nodes data 362 (a list or set of "unlinked" nodes that have no known good edges), queried nodes data 364 (a list or set of "queried" nodes that have been asked for information about their neighbors), good edges data 366, and bad edges data 368. At the outset of process 500, all nodes 125 on network 120 are included in unlinked nodes data 362 and no nodes are included in any of queried nodes 364, good edges 366, or bad edges 368.

In step 502, gateway 115 (via control logic 350) transmits a topological discovery message to a selected node from the list of unlinked nodes, here exemplary node N7 (FIG. 1B). In one embodiment, the selected node is the node closest to the gateway 115, however in other embodiments the selected node may be the first node or a randomly selected node from the list of unlinked nodes, or the selection may be done based on known topological information (e.g., a node known to have a lot of neighbors). This transmission may be done via directed multicast or unicast, or in some embodiments standard multicast transmission. In the exemplary embodiment, at the time gateway 115 transmits its topology discovery message to node N7, gateway 115 stores information sufficient to identify the queried node N7 in queried nodes data 364, such as the node's network ID, a nickname identifying the node, or other unique identifier, such as MAC address. In other embodiments, gateway 115 may store this data in queried nodes data 364 immediately before transmittal, immediately or shortly after transmittal, upon receiving a response to the transmitted message, or at another appropriate time.

Node N7 receives the topology discovery request from gateway 115 via network interface 220. Based on information in the header of the multicast message (e.g., one or more of a network or group identifier, a message type, etc.), control logic 244 of node N7 processes the request and recognizes that it should transmit a message (e.g., a ping) to its neighboring nodes. Node N7 broadcasts out this message to its neighbors as a one-hop message, that is, by setting, in the header, a TTL value of 1. With reference to FIG. 1B, the nodes within one hop of node N7 (its neighbors) are nodes N1, N6, and N8. The transmission by node N7 to nodes N1, N6, and N8 is shown in FIG. 5 as steps 504, 506, and 508, respectively.

Node N1 receives and processes the message transmitted from node N7 and generates a response to send to gateway 115. The response is sent, in step 522, via directed multicast, though other types of messages may be used in other embodiments. Response 522 contains information sufficient to identify node N1 and the source of the retransmitted message (here, node N7), such as the nodes' respective network identifiers or MAC addresses, and information regarding the link between nodes N7 and N1. More particularly, node N1 collects information about link status between the source node (node N7) and itself (node N1), such as an indicator of link quality based on a received signal strength indicator (RSSI) or received channel power indicator (RCPI), though any measurable indicator of link quality may be used. In one alternate embodiment, rather than a specific link RSSI or RCPI value, a binary indicator or flag may be used to indicate that the communication was successfully transmitted between nodes N7 and N1, implying a sufficient link quality. This information is stored, in step 504a, in node N1s link status table 242. As shown in FIG. 5, an exemplary response 522 from node N1 to the gateway 115 indicates that the link quality between node N7 and node N1 is strong (e.g., the RSSI is a relatively high value), that is, messages can be reliably transmitted between nodes N7 and N1. It will be generally understood that node N1 (or any other node 125) need not itself evaluate or categorize link quality, but rather, that node N1s response to the gateway 115 contains a value from which the gateway can perform such evaluation, though other embodiments may distribute the processing or evaluation differently. In some embodiments, node N1 may additionally send one or more acknowledgements (ACK) to node N7 to confirm receipt of the message (not shown). This may be the case in, for instance, an embodiment where N7 and N1 communicate by unicast transmission rather than directed multicast.

In step 506, node N6 receives the message from node N7, stores in its link status table 242 an indicator of link quality between node N7 and node N6 (step 506*a*), and generates and transmits a response to gateway 115 (step 524). In the exemplary embodiment, while node N6 received the message transmitted by node N7, the link quality between the two nodes is poor or otherwise unreliable, e.g., a low RSSI value, message (or a portion thereof) had to be resent, etc. It may be generally understood that the type of information in the responses in steps 522 and 524 is identical (though the values therein may differ), regardless of the link quality.

In exemplary step 508, node N7 retransmits the topology request to node N8, however N8 does not receive the transmission or part of the transmission due to dropped packets, signal loss, power loss, or any other relevant reason. In embodiments where node N7 is expecting an ACK response for packets sent to node N8 (e.g., unicast transmission), node N7 may resend one or more packets, however in other embodiments, no retransmission will occur. As a result, node N8 does not send any response to the gateway.

Gateway 115 receives responses from node N1 (step 522) and node N6 (step 524). In the exemplary embodiment, gateway 115 waits a predetermined amount of time (a waiting period) for responses to its request; that is, the waiting period will run from the time the request was transmitted in step 502. This predetermined amount of time may be defined by one or more rules stored in database 354 and implemented by control logic 350 and/or topology logic 352. In some embodiments, topology logic 352 may determine a waiting period dynamically based on the number of nodes in the network and/or one or more environmental or network utilization conditions. For example, in an embodiment with densely located nodes, topology logic 352 may wait a relatively long period of time under the assumption that node N7 may have a large number of neighboring nodes. In other embodiments, the waiting period may be preset and stored in database 354 based on information input by a network administrator, based on a time of day or maintenance schedule, selected randomly, or the like. In one exemplary embodiment, the waiting period may be implemented as a timeout value (e.g., in seconds or milliseconds) or countdown, where the timeout value is reset every time a new response is received. After the waiting period has expired, gateway 115 concludes that all responses have been received from all nodes neighboring node N7.

In step 532, gateway 115 analyses the information sent in steps 522 and 524 regarding the link between node N7 and each respective neighboring node to determine if a good edge exists between the two. In some embodiments, topology logic 352 may store the received data in one or more tables in database 354 prior to such analysis. In the exemplary embodiment, topology logic 352 evaluates the link quality (RSSI) value in the response and categorizes the edge between node N7 and the responding node as a good or bad edge, however in other embodiments this evaluation may be performed by the node transmitting the response (522, 524) and the resultant categorization transmitted to the gateway. This determination is made by comparing the link quality to a threshold value, which may be set in advance by a network administrator or based on a default or industry standard value or may be determined dynamically by the topology logic 352. If determined dynamically, the threshold link quality delineating a good from a bad edge may be based on factors such as environmental conditions, node or network availability, day/time data, or other conditions that may indicate a divergence from an otherwise expected or default link quality value. In an alternate embodiment, rather than an RSSI or link quality value, the presence of a response from node N1 and node N6 is sufficient to assume a good edge exists between the nodes and no evaluation against a threshold value is performed.

In the example of FIG. 5, because the link quality exceeds a threshold value, gateway 115 determines the N7-N1 edge to be a good edge, and information about the edge (such as identifiers of the two nodes, link quality, or the like) is stored in good edges data 366. Because the link quality does not exceed the threshold value, gateway 115 determines the N7-N6 edge to be a bad edge, and stores information about the edge in bad edges data 368. Additionally in step 532, gateway 115 removes node N7 and node N1 from the unlinked nodes data 362, but does not remove node N6 from that list, as no reliable edge with N6 has been found.

The goal of process 500 is to find a path to each node 125 in network 120; accordingly, gateway 115 is configured to repeat its topological search until no nodes remain in the unlinked nodes list. In step 540, topology logic 352 checks unlinked nodes data 362 to determine if any nodes remain in the list. In the present example, at least nodes N6 and N8 remain unlinked. Accordingly, topology logic 352 continues its discovery process by selecting a node from unlinked nodes data 362 that is not also in queried nodes data 364. This selection of an unlinked node may be done in the same manner as that described above. In step 540, topology logic 352 selects node N6 as its next node to query, and sends node N6 (in step 542) a topology request. The topology request sent in step 542 is in the exemplary embodiment identical to that sent in step 502, though other embodiments may differ.

Node N6, receiving the topology request, takes the same steps taken by node N7 described above and broadcasts out a one-hop message. While FIG. 1B illustrates node N6 as neighboring nodes N1, N5, N7, N8, and N9, for ease of illustration in FIG. 5, only the transmissions to nodes N1, N7, and N8 are shown. In practice, the broadcast from the queried node would go out to each of that node's neighbors (whether received or not). Here, the transmission by node N6 to nodes N1, N7, and N8 is shown in FIG. 5 as steps 546, 544, and 548, respectively. Each of nodes N1, N7, and N8 stores a link status (shown only for node N8 in step 548*a*, though all nodes may perform this step) and generates a response to the gateway 115, with an indication of link status. As shown in the example of FIG. 5, the link status between N6-N7 is weak, the link status between N6-N1 is weak, and the link status between N6-N8 is strong. The responses to the gateway from each of nodes N1, N7, and N8 are transmitted in steps 554, 556, and 558, respectively.

Gateway 115 waits for the responses (step 560) and analyses (step 562) the information sent in steps 554, 556, and 558 regarding the links between node N6 and each respective neighboring node to determine if any good edges exist. In step 562, gateway 115 determines the N6-N7 and N6-N1 edges to be bad edges, and stores information about the edges in bad edges data 368. It further determines the N6-N8 edge to be a good edge, and stores information about the edge in good edges data 366. Additionally in step 532, gateway 115 removes node N6 and node N8 from the unlinked nodes data 362. N7 and N1 had already been removed from unlinked nodes data 362 (in step 532), however, had they not been previously removed, gateway 115 would have retained that data in unlinked nodes data 362.

In step 570, gateway 115 checks unlinked nodes data 362 to determine if any nodes remain in the list. Here, each of nodes N1, N7, N6, and N8 have been removed from unlinked nodes data 362. Though other embodiments may have additional nodes (as shown in FIG. 1B), for ease of explanation in the exemplary embodiment, it may be understood that gateway 570 determines in step 570 that no unlinked nodes remain in unlinked nodes data 362, that is, that at least one good edge has been found for each node. Because gateway 115 has identified at least one edge via which nodes N1, N6, N7, and N8 may receive a transmission (e.g., firmware update), the discovery process can end in step 570, without the need for gateway 115 to separately query nodes N1 and N8. That is, process 500 can be considered as an expedited discovery where it is possible at the end of the discovery process for the set of nodes in queried nodes data 364 to be different and smaller than the entirety of nodes initially listed in unlinked nodes 362. Because less than the entirety of nodes have been queried, the process of discovery is less intensive than a conventional discovery process.

In some embodiments, gateway 115 may (at the end of step 570) use good edges data 366 to generate a topology map for the purpose of pushing updates to nodes, the topology map being a graph or mapping indicating at least one path of good edges to each networked node. This may also be understood as a fully-connected graph, specifically for the purposes of network updates, where only good paths are shown and every possible path between nodes need not be stored in the mapping. In some embodiments, this graph data is stored in database 354. Topology logic 352, in step 580, evaluates good edges data 366 to calculate a path to each node. Any known graph algorithm may be applied for this purpose. Where multiple paths to a node may be calculated, one is selected by prioritizing certain characteristics, through the selection of a particular graph algorithm. In the exemplary embodiment, topology logic 352 refers to data stored in network database 360 and database 354 to determine the shortest path to each node, however other embodiments may use a different metric, for instance the best overall link quality or nodes with available resources. Topology logic 352 may then identify, based on the graph information, a set of the fewest possible nodes that would in turn successfully transmit messages to all of the networked nodes. In one embodiment, this may correspond to selecting one node per cluster of nodes. In the embodiment of FIG. 5, either of nodes N1 and N7 will transmit to the other, and either of nodes N6 and N8 will transmit to the other.

In the exemplary embodiment, topology logic 352, having finished its expedited discovery, may communicate with all nodes in the network. Topology logic 352 uses in step 582 the set of identified nodes to transmit a firmware update to all nodes in the network. In an exemplary embodiment, the firmware update may be initially transmitted from the gateway to one or a subset of the nodes. In the exemplary embodiment, transmission 582 is done via directed multicast, however other embodiments may use other transmission types. The update may then be propagated through the network to all nodes through a neighbor-to-neighbor transmission. In some embodiments, the gateway may instruct each node (e.g., via message header) where to transmit the update, such instruction being based on the graph data (or on the good edge data) stored at the gateway. In an embodiment where the gateway transmitted to node N7 in step 582, node N7 may then, in turn, retransmit the firmware update to its neighbors via multicast, directed multicast, or unicast transmission in step 584. In some embodiments, a structured acknowledgment process may be used to ensure receipt by all nodes with less network overhead and less duplication of transmission. The nodes may process and install the firmware update (or ignore the update) as appropriate (not shown).

In some embodiments, the transmission of topology requests in steps 502 and 542 may be insufficient to reach all nodes, in which case the gateway 115 will continue querying nodes until a fully-connected graph can be generated. In an alternate embodiment, gateway 115 will continue to send topology requests to each of the nodes, regardless of whether the nodes are linked or unlinked, to ensure that all possible edges have been determined, though such embodiments may result in increased network traffic during the discovery process (steps 502-570).

In some embodiments, even after topology queries have been sent to each of the unlinked nodes, one or more nodes 125 may remain unconnected to any other nodes through a good edge, resulting in a graph or mapping indicating paths to only some of the nodes (a partially-connected graph). In this scenario gateway 115 considers "clusters," or sets of nodes connected to each other by good edges. For example, with reference to FIGS. 5, N1 and N7 may be considered a first cluster and N6 and N8 may be considered a second cluster. Topology logic 352 is configured in this scenario to select the smallest cluster (having the least number of nodes) from the graph information stored in database 354. In embodiments where multiple clusters have the smallest number of nodes, topology logic 352 may select the closest or farthest cluster, may select randomly, or use any appropriate means of selection. From that selected cluster, topology logic 352 selects a node with the fewest good edges that is not in the queried nodes data 364 (meaning the gateway 115 has not separately queried that node before, as with nodes N1 and N8 in FIG. 5). The node with the fewest good edges can alternately be understood as the "least connected" node, that is, the node for which the gateway knows the least about its neighbors. Such nodes are more likely to have a greater number of "unfound" edges (referred to whether they are "found" in this topological discovery), and by selecting these nodes, it is more likely that the gateway will quickly discover the sufficient number of good edges. Topology logic 352 then transmits a topology request to the selected node (as in step 502) prompting the transmittal of neighboring node information via directed multicast. The selected node is then added to the queried nodes data 364. The topology process 500 is executed as described above.

In conventional solutions, a gateway device conducts a census by transmitting a topology request to each networked node to obtain a full mapping of each node and each of its neighbors, finding all possible edges. However, in a dense network, this process is slow, with duplicative transmissions that increase network traffic and cause delays. High traffic and transmission delays may lead to increased network downtime or other delays, wasting human and computing resources. In contrast, rather than a full topology discovery, the systems and methods described herein limit their focus to good edges, and ignore duplicative paths of communication. By reducing the time necessary for discovery, a gateway may move on to pushing updates to nodes more quickly, thereby significantly shortening the process of upgrading. For instance, where a conventional neighbor-to-neighbor upgrade may take 30 seconds or more, a process limiting discovery to finding good edges may only take about 10 seconds per node, though these numbers are of course merely exemplary. The systems and methods described herein therefore reduce both the necessary time and the necessary number of messages (and therefore overall network congestion) for discovery, improve network uptime, and reduce the usage of computing resources in the update process.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A system comprising:
   a plurality of nodes configured to send and receive messages over a wireless network; and
   a network management device configured to communicate on the wireless network;
   wherein each node of the plurality of nodes is configured to:
   (a) in a case that the node receives a topological discovery request from the network management device, send a one-hop multicast message based on the topological discovery request, and
   (b) in a case that the node receives a message from a neighboring node, store, in a memory, link status information regarding a link between itself and the neighboring node, and transmit, to the network management device, a message comprising the link status information, and
   wherein the network management device is configured to:
   (1) obtain, from a memory, a list of unlinked nodes comprising all nodes of the plurality of nodes;
   (2) perform the following steps (i)-(iv) in an iterative manner, until the network management device determines that each of the plurality of nodes has been removed from the list:
      (i) sending a topological discovery request over the wireless network to a first node of the list of unlinked nodes and removing the first node from the list of unlinked nodes, and adding the first node to a set of queried nodes;
      (ii) receiving one of more messages comprising link status information from a respective each of one or more nodes neighboring the first node;
      (iii) storing, for each of the one or more nodes neighboring the first node, based on the link status information in the respective received message, edge data indicating whether a good edge or a bad edge exists between the first node and its neighboring node;
      (iv) for each of the one or more nodes neighboring the first node, if a good edge exists between the first node and the neighboring node, removing the neighboring node from the list of unlinked nodes; and
   (3) generate, based on the stored edge data, a topology map of the plurality of nodes on the wireless network.

2. The system of claim 1, wherein the network management device is further configured to:
   compare the link status information to a threshold link quality value; and
   determine that a good edge exists between the first node and the neighboring node based on the comparison.

3. The system of claim 1, wherein the link status information comprises, in association with each other, (i) a network identifier of the first node, (ii) a network identifier of the neighboring node, and (iii) a value indicating a link quality between the first node and the neighboring node.

4. The system of claim 1, wherein the network management device is further configured to:
   (a) determine, based on the topology map of the plurality of nodes, using one or more graph algorithms, a set of nodes of the plurality of nodes for which good edges exist to create a fully-connected graph between the plurality of nodes,
   transmit one or more packets to each node in the determined set of nodes without transmitting the one of more packets to of the plurality of nodes not in the determined set of nodes.

5. The system of claim 4, wherein the one or more packets comprise all or part of a firmware update to be applied to at least one node of the plurality of nodes.

6. The system of claim 4, wherein the one or more graph algorithms comprises a shortest path algorithm.

7. The system of claim 1, wherein the first node is a lighting system comprising a light source.

8. A network management device configured to communicate with a plurality of nodes over a wireless network, the network management device being configured to:
   (a) obtain, from a memory, stored topology data regarding the plurality of nodes, the stored topology data comprising good edge data;
   (b) determine whether the good edge data includes information for each of the plurality of nodes;
   (c) in a case that the good edge data does not include information for each of the plurality of nodes, perform the following steps in an iterative manner until the good edge data includes information for each of the plurality of nodes,
      (i) selecting a node, of the plurality of nodes, that has not yet been sent a topological query,
      (ii) sending a topology query to the selected node via direct multicast transmission or unicast transmission,
      (iii) receiving, from each of one or more neighboring nodes of the plurality of nodes, link status information regarding a link between the selected node and the respective neighboring node, and
      (iv) if the received link status information indicates that the communication link quality of the link between the selected node and a respective neighboring node exceeds a threshold value, storing, in the good edge data, data associating the first node and that respective neighboring node;
   (d) determine, based on the good edge data, a subset of the plurality of nodes for which good edge data exists to create a fully-connected graph between the plurality of nodes; and (e) transmit one or more packets to the nodes in the subset of the plurality of nodes via directed multicast transmission or unicast transmission.

9. The network management device of claim 8, wherein it is determined that the good edge data does not include information for each of the plurality of nodes if at least one of the plurality of nodes is not associated with any other node in the good edge data.

10. The network management device of claim 8, wherein the link status information comprises, in association with each other, (i) a network identifier of the selected node, (ii) a network identifier of the respective neighboring node, and (iii) a value indicating a received signal strength indicator of a signal between the selected node and the respective neighboring node.

11. The network management device of claim 8, wherein the network management device determines the subset of the plurality of nodes for which good edge data exists to create a fully connected graph between the plurality of nodes by applying one or more graph algorithms to the good edge data.

12. The network management device of claim 11, wherein the one or more graph algorithms comprises a shortest path algorithm.

13. The network management device of claim 8, wherein each of the plurality of nodes is a lighting system comprising a light source.

14. A method comprising:
obtaining from a memory, by a network management device configured to communicate with a plurality of nodes over a wireless network, topology data regarding the plurality of nodes, the topology data comprising good edge data;
determining, by the network management device, whether the good edge data includes information for each of the plurality of nodes;
in a case that the good edge data does not include information for each of the plurality of nodes, performing, by the network management device, steps (i)-(iv) in an iterative manner until the good edge data includes information for each of the plurality of nodes:
  (i) selecting by the network management device, a node of the plurality of nodes that has not yet been sent a topological query,
  (ii) transmitting, by the network management device, a topology query to the selected node via direct multicast transmission or unicast transmission,
  (iii) receiving, by the network management device from each of one or more neighboring nodes of the plurality of nodes, link status information regarding a link between the selected node and the respective neighboring node, and
  (iv) if the received link status information indicates that the communication link quality of the link between the selected node and a respective neighboring node exceeds a threshold value, storing, by the network management device, in the good edge data, data associating the first node and that respective neighboring node;
determining, by the network management device, based on the good edge data, a subset of the plurality of nodes for which good edge data exists to create a fully-connected graph between the plurality of nodes; and
transmitting, by the network management device, one or more packets to the nodes in the subset of the plurality of nodes via directed multicast transmission or unicast transmission.

15. The method of claim 14, wherein the link status information comprises, in association with each other, (i) a network identifier of the selected node, (ii) a network identifier of the respective neighboring node, and (iii) a value indicating a received signal strength indicator of a signal between the selected node and the respective neighboring node.

16. The method of claim 14, wherein the network management device determines the subset of the plurality of nodes for which good edge data exists to create a fully-connected graph between the plurality of nodes by applying one or more graph algorithms to the mapping data.

17. The method of claim 16, wherein the one or more graph algorithms comprises a shortest path algorithm.

18. The method of claim 14, wherein it is determined that the good edge data does not include information for each of the plurality of nodes if at least one of the plurality of nodes is not associated with any other node in the good edge data.

19. The method of claim 14, wherein the topology data further comprises bad edge data, unlinked node data, and queried node data.

20. The method of claim 14, wherein the one or more packets comprise all or part of a firmware update to be applied to at least one node of the plurality of nodes.

* * * * *